US012676016B2

(12) United States Patent
Godaliyadda et al.

(10) Patent No.: US 12,676,016 B2
(45) Date of Patent: Jul. 7, 2026

(54) IMAGE BURST EDITING BASED ON NATURAL LANGUAGE PROCESSING (NLP) INPUT

(71) Applicant: Samsung Electronics Co., Ltd., Suwon-si (KR)

(72) Inventors: Gunawath Dilshan Godaliyadda, Allen, TX (US); Zeeshan Nadir, Allen, TX (US); Soumendu Majee, McKinney, TX (US); John W. Glotzbach, Allen, TX (US); John Seokjun Lee, Allen, TX (US); Hamid R. Sheikh, Allen, TX (US); Michael O. Polley, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 257 days.

(21) Appl. No.: 18/532,920

(22) Filed: Dec. 7, 2023

(65) Prior Publication Data

US 2025/0191393 A1     Jun. 12, 2025

(51) Int. Cl.
*G06V 20/70* (2022.01)
*G06F 40/279* (2020.01)

(52) U.S. Cl.
CPC ............ *G06V 20/70* (2022.01); *G06F 40/279* (2020.01)

(58) Field of Classification Search
CPC ........ G06V 20/70; G06F 40/279; G06F 40/30
See application file for complete search history.

(56) References Cited

U.S. PATENT DOCUMENTS

| | | | | |
|---|---|---|---|---|
| 10,498,963 | B1 * | 12/2019 | Sorgi | G06T 5/50 |
| 11,184,558 | B1 * | 11/2021 | Zhang | G06V 10/255 |
| 11,544,602 | B2 * | 1/2023 | Lee | G06F 16/3329 |
| 11,763,235 | B1 * | 9/2023 | Penfield | G06Q 10/0635 704/9 |

(Continued)

FOREIGN PATENT DOCUMENTS

CN         114943789 A     8/2022

OTHER PUBLICATIONS

Liu P, Ning Y, Wu KK, Li K, Meng H. Open intent discovery through unsupervised semantic clustering and dependency parsing. arXiv preprint arXiv:2104.12114. Apr. 25, 2021.*

(Continued)

*Primary Examiner* — Xuemei G Chen

(57) ABSTRACT

A method includes obtaining, using at least one processing device of an electronic device, a sequence of images of a scene. The method also includes performing, using the at least one processing device, instance segmentation of the sequence of images to generate a sequence of segmented images. Performing the instance segmentation includes (i) segmenting each of the images into semantic classes and (ii) separately identifying two or more objects in the scene associated with a common semantic class, where different semantic classes are associated with different types of image contents. The method further includes processing, using the at least one processing device, the sequence of segmented images to generate a final image of the scene. The sequence of segmented images is processed using one or more image processing operations determined using a natural language processing (NLP) engine.

20 Claims, 6 Drawing Sheets

(56) References Cited

U.S. PATENT DOCUMENTS

| | | | | |
|---|---|---|---|---|
| 2002/0028026 A1* | 3/2002 | Chen | ...................... | H04N 5/782 |
| | | | | 382/284 |
| 2007/0167760 A1* | 7/2007 | Kim | ...................... | G06V 10/25 |
| | | | | 600/437 |
| 2018/0122379 A1* | 5/2018 | Sohn | ...................... | G10L 17/22 |
| 2018/0173996 A1* | 6/2018 | Lim | ...................... | G06F 18/22 |
| 2018/0285744 A1* | 10/2018 | Kang | ...................... | G06V 20/63 |
| 2019/0080457 A1* | 3/2019 | Shukla | ................. | G06V 40/161 |
| 2019/0180343 A1* | 6/2019 | Arnett | ................ | G06Q 30/0633 |
| 2019/0392831 A1* | 12/2019 | Pohl | ...................... | H04N 23/62 |
| 2021/0142127 A1* | 5/2021 | Lee | ...................... | G06F 18/217 |
| 2021/0327055 A1* | 10/2021 | Putha | ................. | G06V 10/774 |
| 2022/0101578 A1* | 3/2022 | Bedi | ...................... | G06T 11/00 |
| 2022/0374069 A1* | 11/2022 | Wexler | ................. | G10L 15/22 |
| 2022/0392046 A1 | 12/2022 | Cohen et al. | | |
| 2022/0414141 A1* | 12/2022 | Tian | ...................... | G06V 10/764 |
| 2022/0414142 A1 | 12/2022 | Chang et al. | | |
| 2023/0017202 A1 | 1/2023 | Zhang | | |
| 2023/0237088 A1 | 7/2023 | Cohen et al. | | |
| 2023/0274088 A1* | 8/2023 | Peng | ...................... | G06F 40/295 |
| | | | | 704/9 |
| 2024/0119682 A1* | 4/2024 | Rudman | ............. | G06T 19/006 |
| 2024/0273877 A1* | 8/2024 | Guerreiro-Lucas | .... | G06V 20/69 |
| 2024/0331007 A1* | 10/2024 | Japertas | ................. | G10L 15/18 |
| 2024/0378874 A1* | 11/2024 | Schulter | ............... | G06V 10/764 |
| 2024/0386675 A1* | 11/2024 | Healey | ................... | G10L 15/22 |
| 2024/0422284 A1* | 12/2024 | Vanchinathan | ...... | H04N 23/632 |
| 2025/0104451 A1* | 3/2025 | Ravishankar | ........ | G06V 10/774 |
| 2025/0181711 A1* | 6/2025 | Monteuuis | .......... | G06V 10/764 |

OTHER PUBLICATIONS

Gupta T, Kamath A, Kembhavi A, Hoiem D. Towards general purpose vision systems: An end-to-end task-agnostic vision-language architecture. InProceedings of the IEEE/CVF Conference on Computer Vision and Pattern Recognition 2022 (pp. 16399-16409).*

Dozat et al., "Deep Biaffine Attention for Neural Dependency Parsing," ICLR 2017, Mar. 2017, 8 pages.

Levy et al., "Dependency-Based Word Embeddings," Proceedings of the 52nd Annual Meeting of the Association for Computational Linguistics, Jun. 2014, 7 pages.

Hu et al., "Natural Language Object Retrieval," Proceedings of the IEEE Conference on Computer Vision and Pattern Recognition, Apr. 2016, 14 pages.

He et al., "Mask R-CNN," Computer Vision and Pattern Recognition (cs.CV), Jan. 2018, 12 pages.

Chen et al., "Joint Anchor-Feature Refinement for Real-Time Accurate Object Detection in Images and Videos," Computer Vision and Pattern Recognition (cs.CV), Mar. 2020, 15 pages.

Kuo et al., "FindIt: Generalized Localization with Natural Language Queries," European Conference on Computer Vision (ECCV) 2022, Aug. 2022, 22 pages.

* cited by examiner

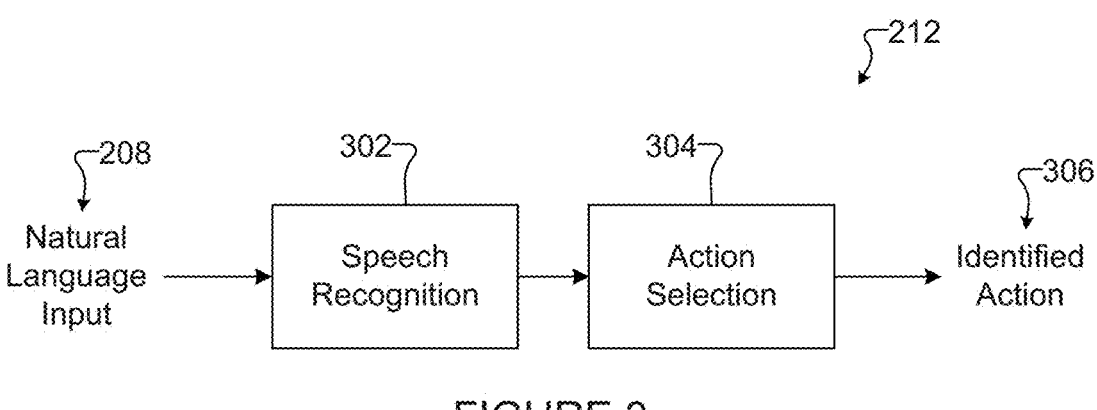
FIGURE 3
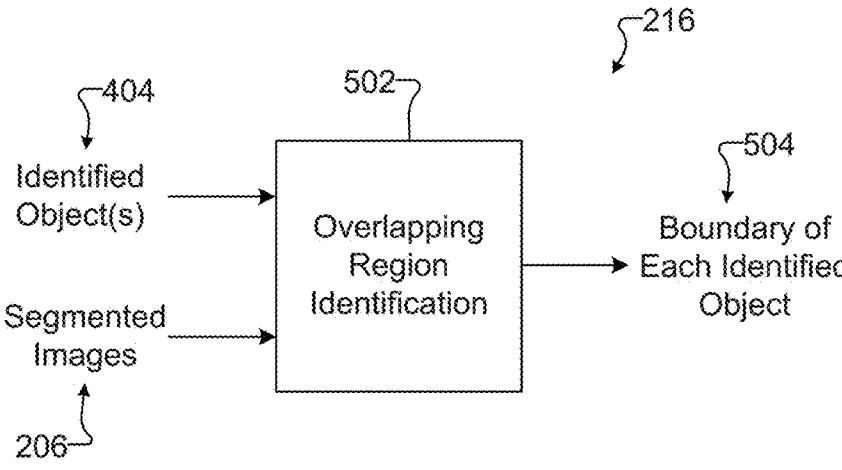
FIGURE 4
FIGURE 5

702

604

602

800

START

802 — Obtain sequence of input images of scene

804 — Perform instance segmentation of input images to generate sequence of segmented images 806 — Obtain natural language input 808 — Identify image processing task(s) to be performed using natural language input 810 — Perform image processing task(s) to generate output image of scene 812 — Store/output/use output image

END

IMAGE BURST EDITING BASED ON NATURAL LANGUAGE PROCESSING (NLP) INPUT

TECHNICAL FIELD

This disclosure relates generally to image processing systems. More specifically, this disclosure relates to image burst editing based on natural language processing (NLP) input.

BACKGROUND

Many mobile electronic devices, such as smartphones and tablet computers, include cameras that can be used to capture still and video images. In some cases, images can be captured and subsequently presented to users. Often times, users are able to view the captured images and invoke various editing functions to adjust selected images. For example, the editing functions can be used by the users to alter the white balance, saturation, color tone, or other characteristics of the selected images.

SUMMARY

This disclosure relates to image burst editing based on natural language processing (NLP) input.

In a first embodiment, a method includes obtaining, using at least one processing device of an electronic device, a sequence of images of a scene. The method also includes performing, using the at least one processing device, instance segmentation of the sequence of images to generate a sequence of segmented images. Performing the instance segmentation includes (i) segmenting each of the images into semantic classes and (ii) separately identifying two or more objects in the scene associated with a common semantic class, where different semantic classes are associated with different types of image contents. The method further includes processing, using the at least one processing device, the sequence of segmented images to generate a final image of the scene. The sequence of segmented images is processed using one or more image processing operations determined using an NLP engine.

In a second embodiment, an electronic device includes at least one imaging sensor configured to capture a sequence of images of a scene. The electronic device also includes at least one processing device configured to perform instance segmentation of the sequence of images to generate a sequence of segmented images. To perform the instance segmentation, the at least one processing device is configured to (i) segment each of the images into semantic classes and (ii) separately identify two or more objects in the scene associated with a common semantic class, where different semantic classes are associated with different types of image contents. The at least one processing device is also configured to process the sequence of segmented images to generate a final image of the scene. The at least one processing device is configured to process the sequence of segmented images using one or more image processing operations determined using an NLP engine.

In a third embodiment, a non-transitory machine readable medium contains instructions that when executed cause at least one processor of an electronic device to obtain a sequence of images of a scene. The non-transitory machine readable medium also contains instructions that when executed cause the at least one processor to perform instance segmentation of the sequence of images to generate a sequence of segmented images. The instructions that when executed cause the at least one processor to perform the instance segmentation include instructions that when executed cause the at least one processor to (i) segment each of the images into semantic classes and (ii) separately identify two or more objects in the scene associated with a common semantic class, where different semantic classes are associated with different types of image contents. The non-transitory machine readable medium further contains instructions that when executed cause the at least one processor to process the sequence of segmented images to generate a final image of the scene. The instructions that when executed cause the at least one processor to process the sequence of segmented images include instructions that when executed cause the at least one processor to process the sequence of segmented images using one or more image processing operations determined using an NLP engine.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which:

FIG. 3 illustrates an example action identification function in the architecture of FIG. 2 in accordance with this disclosure;

FIG. 4 illustrates an example object identification function in the architecture of FIG. 2 in accordance with this disclosure;

FIG. 5 illustrates an example object-to-segmentation mapping function in the architecture of FIG. 2 in accordance with this disclosure;

DETAILED DESCRIPTION

Figure 1:
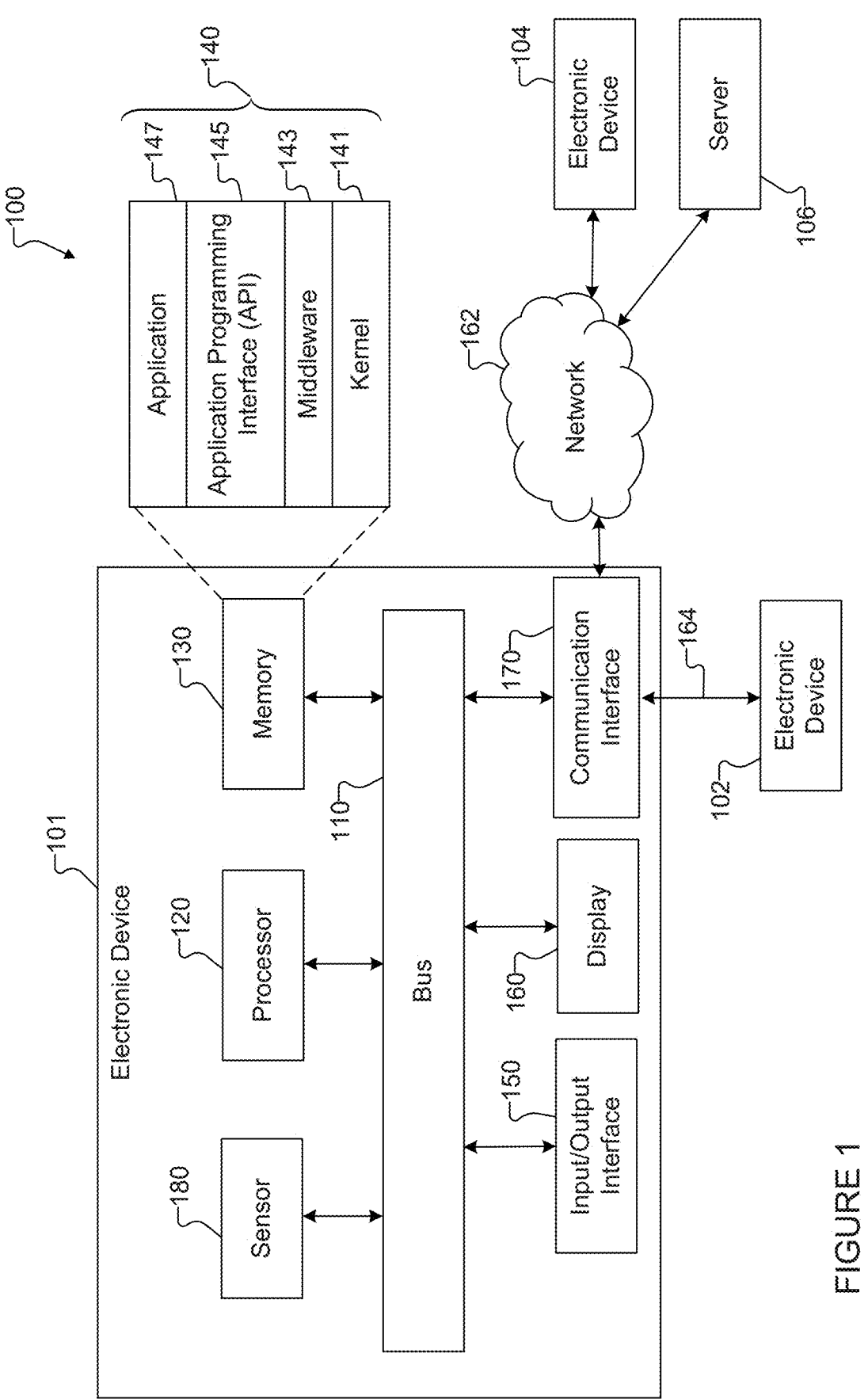
FIG. 1 illustrates an example network configuration including an electronic device in accordance with this disclosure.

FIGS. 1 through 8, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, many mobile electronic devices, such as smartphones and tablet computers, include cameras that can be used to capture still and video images. In some cases, images can be captured and subsequently presented to users. Often times, users are able to view the captured images and invoke various editing functions to adjust selected images. For example, the editing functions can be used by the users to alter the white balance, saturation, color tone, or other characteristics of the selected images. Unfortunately, there are various circumstances in which users may not be able to edit individual captured images as desired without causing undesired artifacts. For example, removing a moving object from a captured image may introduce motion blur.

This disclosure provides various techniques for image burst editing based on natural language processing (NLP) input. As described in more detail below, a sequence of images of a scene can be obtained, such as when images in a burst of images are captured in rapid succession or at substantially the same time. Instance segmentation of the sequence of images can be performed in order to generate a sequence of segmented images. The instance segmentation can include segmenting each of the images into semantic classes, where different semantic classes are associated with different types of image contents. Note that two or more different objects within a common semantic class can be separately identified and segmented here, such as when the different objects have their own pixel masks to distinguish them from other objects belonging to the same semantic class or to different semantic classes. The sequence of segmented images can be processed in order to generate a final image of the scene. The sequence of segmented images can be processed using one or more image processing operations determined using an NLP engine. For instance, a user input (such as a voice input) can be provided to the NLP engine, an action to be performed can be identified from among multiple actions based on the user input, at least one object in the scene can be identified based on the user input, and the identified object(s) can be mapped to results of the instance segmentation. The one or more image processing operations to be performed can be identified in order to perform the identified action involving the identified object(s) as mapped to the results of the instance segmentation. In some cases, machine learning-based dependency parsing can be used to identify the object(s) in the scene as being associated with the identified action. An order in which to perform multiple image processing operations can also be determined. The one or more image processing operations may be performed in order to obtain various types of results, such as the removal of at least one object in the scene captured in the sequence of images or the creation of artistic motion blurring with motion that is extrapolation based on the sequence of images.

In this way, the disclosed techniques allow users to provide voice inputs or other NLP inputs, and the NLP engine can determine what image processing operations should be performed and which objects or other portions of captured images should to be subjected to the image processing operations. This allows the users to more easily invoke various image processing operations and achieve desired results. Moreover, since the NLP engine can be used to identify which objects or other portions of captured images are to be subjected to the image processing operations, this can reduce or avoid the need for the users to manually identify objects and their boundaries within the captured images.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to obtain a burst or sequence of images and perform image editing based on NLP input.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for performing image burst editing based on NLP input. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that includes one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to obtain a burst or sequence of images and perform image editing based on NLP input.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
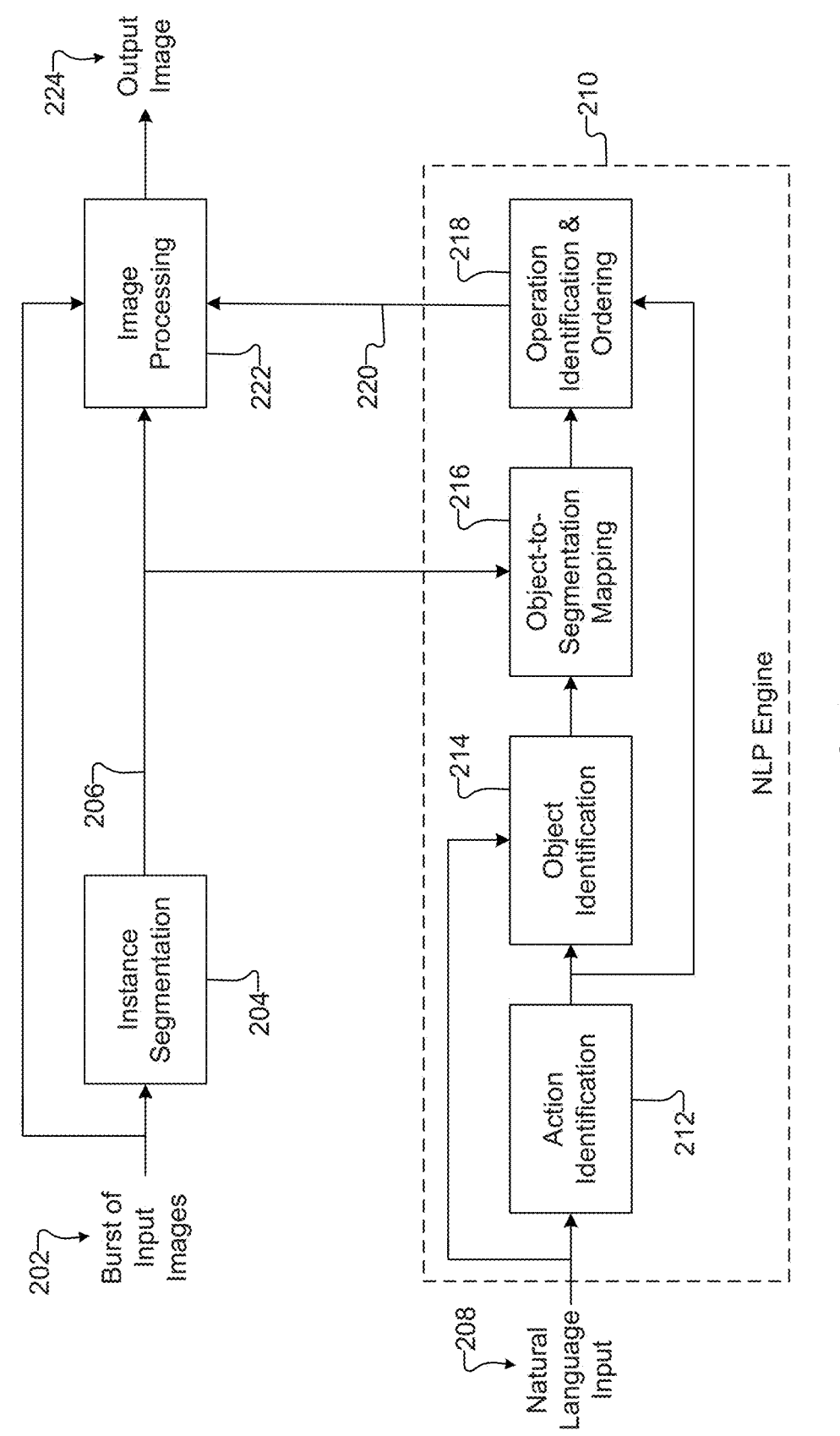
FIG. 2 illustrates an example architecture supporting image burst editing based on natural language processing (NLP) input in accordance with this disclosure.

FIG. 2 illustrates an example architecture 200 supporting image burst editing based on NLP input in accordance with this disclosure. For ease of explanation, the architecture 200 shown in FIG. 2 is described as being implemented on or supported by the electronic device 101 in the network configuration 100 of FIG. 1. However, the architecture 200 shown in FIG. 2 could be used with any other suitable device(s) and in any other suitable system(s), such as when the architecture 200 is implemented on or supported by the server 106.

As shown in FIG. 2, the architecture 200 generally receives and processes a sequence or burst of input images 202. The burst of input images 202 may include images captured in rapid succession or at substantially the same time. The input images 202 may be obtained from any suitable source(s), such as when the input images 202 are captured using at least one camera or other imaging sensor 180 of the electronic device 101 during an image capture operation. In some embodiments, the input images 202 represent raw image frames. Raw image frames typically refer to image frames that have undergone little if any processing after being captured. The availability of raw image frames can be useful in a number of circumstances since the raw image frames can be subsequently processed to achieve the creation of desired effects in output images. In many cases, for example, the input images 202 can have a wider dynamic range or a wider color gamut that is narrowed during image processing operations in order to produce still or video images suitable for display or other use. The burst of input images 202 here may include any suitable number of input images 202, such as two or more input images 202. Each input image 202 can have any suitable format, such as a Bayer or other raw image format, a red-green-blue (RGB) image format, or a luma-chroma (YUV) image format. Each input image 202 can also have any suitable resolution, such as up to fifty megapixels or more.

In some embodiments, the input images 202 may include two or more images captured using different capture conditions. The capture conditions can represent any suitable settings of the electronic device 101 or other device used to capture the input images 202 or any suitable contents of scenes being imaged. For example, the capture conditions may represent different exposure settings of the imaging sensor(s) 180 used to capture the input images 202, such as different exposure times or ISO settings. In multi-frame processing pipelines, for instance, multiple input images 202 can be captured using different exposure settings so that portions of different input images 202 can be combined to produce a high dynamic range (HDR) output image or other blended image. The multiple input images 202 can also have different image contents when capturing dynamic scenes, such as when different portions of the input images 202 have different luminance (BV). In other embodiments, the input images 202 may include two or more images captured using common capture conditions.

The input images 202 are processed using an instance segmentation function 204, which generally operates to process the input images 202 and generate segmented images 206. Each segmented image 206 represents an associated input image 202 as segmented or divided based on the contents of the associated input image 202. For example, each segmented image 206 may represent an instance segmentation mask or other collection of indicators that identify one or more objects within the associated input image 202 and which pixels of the associated input image 202 are associated with each object. As particular examples, each segmented image 206 may identify pixels of the associated input image 202 that are associated with people, animals, trees or other plants, buildings/walls/floors/windows/other manmade structures, the ground, grass, water, the sky, or the background within the associated input image 202. The instance segmentation function 204 may use any suitable technique for segmenting input images 202. In some embodiments, for example, the instance segmentation function 204 may represent or include a machine learning model, such as a convolutional neural network (CNN) or other neural network, that has been trained to perform image segmentation. In particular embodiments, the instance segmentation function 204 may implement the techniques described in He et al., "Mask R-CNN," 2017 IEEE International Conference on Computer Vision, October 2017 (which is hereby incorporated by reference in its entirety).

The architecture 200 also generally receives and processes a natural language input 208. The natural language input 208 represents user input defining one or more image processing operations to be performed using the burst of input images 202. The natural language input 208 may take any suitable form, such as a voice input that is converted into text or a textual input. In some embodiments, the natural language input 208 may typically identify at least one action to be performed using the burst of input images 202 and at least one object captured in the burst of input images 202 to which the at least one action will be applied.

As shown in FIG. 2, the natural language input 208 is provided to an NLP engine 210, which generally operates to process the natural language input 208 and the segmented images 206 in order to identify one or more image processing operations to be performed on the input images 202 based on the natural language input 208. For example, the NLP engine 210 can analyze the natural language input 208 in order to identify (i) the action or actions to be performed on the burst of input images 202 and (ii) the object or objects in the burst of input images 202 to which the action(s) are to be applied.

In this example, the NLP engine 210 implements an action identification function 212, an object identification function 214, an object-to-segmentation mapping function 216, and an operation identification and ordering function 218. The action identification function 212 generally operates to process the natural language input 208 in order to identify a specific action or actions to be performed based on the natural language input 208. For example, the action identification function 212 may be used to determine if the user who provided the natural language input 208 is requesting removal of at least one object from the burst of input images 202, enhancement of colors in the burst of input images 202, changes to color saturation of the burst of input images 202, creation of artistic motion blurring using the burst of input images 202, removal of colors from at least one object for artistic effects, stretching or shrinking at least one object, or other functions. The action identification function 212 can use any suitable technique(s) to identify one or more actions to be performed based on the natural language input 208. In some embodiments, for example, the action identification function 212 can process the natural language input 208 in order to select a specific action from a dictionary of known or available actions.

The object identification function 214 generally operates to process the natural language input 208 and the identified action from the action identification function 212 in order to identify a specific object or objects captured in the burst of input images 202. For example, the object identification function 214 may be used to determine if the user who provided the natural language input 208 is requesting one or more actions be performed for at least one person, animal, tree or other plant, building/wall/floor/window/other man-made structure, the ground, grass, water, the sky, or the background within the burst of input images 202. The object identification function 214 can use any suitable technique(s) to identify one or more objects captured within input images 202 based on the natural language input 208. In some embodiments, for example, the object identification function 214 can process the natural language input 208 and the identified action using dependency parsing.

The object-to-segmentation mapping function 216 generally operates to process at least one of the segmented images 206 and the identified object(s) from the object identification function 214 in order to map each identified object to one or more segments in at least one of the segmented images 206. For example, the object-to-segmentation mapping function 216 can use at least one identified object from the object identification function 214 and determine which object or objects in at least one of the segmented images 206 correspond to the identified object(s). As a particular example, if the natural language input 208 requests image modifications involving a particular person (such as a person wearing a particular item of clothing or a person positioned at a particular location) or other specific object, the object-to-segmentation mapping function 216 can determine which segmented object in the segmented image(s) 206 corresponds to that particular person or other specific object. The object-to-segmentation mapping function 216 can use any suitable technique(s) to map identified objects to objects in segmentation masks or other segmented images 206. In some embodiments, for example, the object-to-segmentation mapping function 216 can identify overlapping bounding boxes or other overlapping areas between the identified object(s) from the object identification function 214 and the segments of the segmented image(s) 206.

The operation identification and ordering function 218 generally operates to process the identified action from the action identification function 212 and the mapping from the object-to-segmentation mapping function 216 in order to identify one or more image processing operations to be performed in order to perform the identified action on the identified object(s) associated with the mapping. For example, if the identified action involves removal of at least one object from the burst of input images 202, the operation identification and ordering function 218 can identify one or more image processing operations that involve isolating regions of the input images 202 containing the identified object(s) (based on the mapping) and blending or otherwise combining portions of two or more input images 202 in order to remove the identified object(s). If the identified action involves enhancement of colors or changes to color saturation, the operation identification and ordering function 218 can identify one or more image processing operations that involve isolating regions of the input images 202 containing at least one identified object (based on the mapping) and performance of the color enhancement or color saturation changes. If the identified action involves creation of artistic motion blurring, the operation identification and ordering function 218 can identify one or more image processing operations that involve isolating regions of the input images 202 containing at least one identified object (based on the mapping) and blending or otherwise combining portions of two or more input images 202 in order to create the motion blur. If the identified action involves removal of colors from at least one object for artistic effects or stretching or shrinking at least one object, the operation identification and ordering function 218 can identify one or more image processing operations that involve isolating regions of the input images 202 containing the identified object(s) (based on the mapping) and changing image data for the object(s) to grayscale data only or stretching or shrinking the image data for the object(s). In general, the image processing operations to be performed can vary depending on the specific function or functions being requested by the user in the natural language input 208. The operation identification and ordering function 218 here operates to produce an operation listing 220, which identifies the one or more image processing operations to be performed. The operation listing 220 may also optionally identify an ordering of multiple image processing operations to be performed.

An image processing function 222 can process the input images 202, the segmented images 206, and the operation listing 220 in order to perform the image processing operation(s) identified by the NLP engine 210. For example, if the user requested removal of at least one object from the burst of input images 202, the image processing function 222 can perform blending or other combination operations in order to combine portions of two or more input images 202 in order to remove the identified object(s). If the user requested enhancement of colors or changes to color saturation, the image processing function 222 can perform color enhancement or color saturation adjustment to portions of one or more input images 202 involving at least one identified object and optionally blend the results. If the user requested creation of artistic motion blurring, the image processing function 222 can perform blending or other combination operations in order to combine portions of two or more input images 202 in order to provide the requested motion blur involving at least one identified object. If the user requested removal of colors from at least one object for artistic effects or stretching or shrinking at least one object, the image processing function 222 can alter image data or expand/contract the size of the object(s). In some embodiments, for each of these examples, the segmented images 206 can be used to control which areas of the input images 202 are blended, modified, or otherwise processed, such as by limiting the blending, modifications, or other processing to areas in which the identified object or objects are located in the input images 202. The image processing function 222 generates an output image 224, which represents an image formed using the burst of input images 202 as modified based on the function(s) requested in the natural language input 208.

Note that the architecture 200 shown in FIG. 2 may be used any number of times to process any number of image bursts and natural language inputs. Also note that the bursts of input images 202 and the natural language inputs 208 may be received at any suitable times. For instance, in some cases, a burst of input images 202 and an associated natural language input 208 may be obtained at or near the same time, such as when a user using the electronic device 101 initiates an image capture operation and provides a natural language input 208 shortly before, during, or shortly after the image capture operation. In other cases, a burst of input images 202 and an associated natural language input 208 may be obtained at different times. For example, the electronic device 101 may support a "gallery" mode or other mode in which various captured images are presented to a user. The user may select a particular burst of input images 202 (such as by selecting a thumbnail associated with the burst of input images 202) and provide a natural language input 208 describing a desired action to be performed using the selected burst of input images 202.

FIG. 3 illustrates an example action identification function 212 in the architecture 200 of FIG. 2 in accordance with this disclosure. As shown in FIG. 3, the action identification function 212 receives and processes a natural language input 208 by performing a speech recognition function 302 and an action selection function 304. The speech recognition function 302 generally operates to convert voice input to text, such as by recognizing words spoken by the user who provided the natural language input 208. The speech recognition function 302 may use any suitable technique(s) for converting user input into text, such as by using a machine learning model that has been trained to convert speech to text. Note that FIG. 3 assumes the action identification function 212 is receiving a voice-based natural language input 208, in which case voice-to-text conversion via speech recognition can be used. However, the natural language input 208 may take other forms, such as a textual-based natural language input from a user. In those cases, the speech recognition function 302 may not be needed.

Text associated with the natural language input 208 is processed by the action selection function 304 in order to identify an action 306 associated with the natural language input 208. In some embodiments, the action selection function 304 can support a dictionary of known or available actions that can be invoked by the user, and the action selection function 304 can process the text associated with the natural language input 208 in order to identify which action in the dictionary appears to be most similar to the action requested by the user. Examples of actions that may be identified in the dictionary could include removal of at least one object from a burst of input images 202, enhancement of colors in the burst of input images 202, changes to color saturation of the burst of input images 202, creation of artistic motion blurring using the burst of input images 202, removal of colors from at least one object for artistic effects, stretching or shrinking at least one object, deletion of the burst of input images 202, or other functions. The identified action 306 that is selected by the action selection function 304 can be output, such as when the identified action 306 is provided to the object identification function 214.

FIG. 4 illustrates an example object identification function 214 in the architecture 200 of FIG. 2 in accordance with this disclosure. As shown in FIG. 4, the object identification function 214 receives and processes the natural language input 208 and the identified action 306 by performing a dependency parsing function 402. The dependency parsing function 402 generally operates to process the natural language input 208 and identify at least one object that is associated with the identified action 306 in the natural language input 208. As a particular example, the natural language input 208 may represent a sentence "Remove the person in the blue shirt," and the identified action 306 may represent the action "remove." The dependency parsing function 402 can process these inputs and determine that the at least one object in the natural language input 208 being referenced by the identified action 306 is "person in the blue shirt." The dependency parsing function 402 generates at least one identified object 404, which represents an identification of the object(s) mentioned in the natural language input 208.

The dependency parsing function 402 may use any suitable technique(s) to identify objects being referenced in natural language inputs 208. In some embodiments, for instance, the dependency parsing function 402 may represent a machine learning-based dependency parsing function, meaning the dependency parsing function 402 is implemented by or includes a machine learning model that has been trained to identify objects referenced in natural language inputs 208. As a particular example, the dependency parsing function 402 may implement the techniques described in Dozat et al., "Deep Biaffine Attention for Neural Dependency Parsing," Proceedings of the 5th International Conference on Learning Representations, 2017 (which is hereby incorporated by reference in its entirety). As another particular example, the dependency parsing function 402 may implement the techniques described in Levy et al., "Dependency-Based Word Embeddings," Proceedings of the 52nd Annual Meeting of the Association for Computational Linguistics (Volume 2: Short Papers), 2014 (which is hereby incorporated by reference in its entirety). Each identified object 404 that is identified by the dependency parsing function 402 can be output, such as when the identified object 404 is provided to the object-to-segmentation mapping function 216.

FIG. 5 illustrates an example object-to-segmentation mapping function 216 in the architecture 200 of FIG. 2 in accordance with this disclosure. As shown in FIG. 5, the object-to-segmentation mapping function 216 receives and processes at least one of the segmented images 206 and each identified object 404 by performing an overlapping region identification function 502. The overlapping region identification function 502 generally operates to process at least one of the segmented images 206 and determine which object in the segmented image(s) 206 corresponds to each identified object 404. For example, in some embodiments, an identified object 404 can include or be used to define a bounding box around a particular object in the input images 202. Also, in some embodiments, each segmented image 206 can include both (i) a bounding box around each detected object in the input images 202 and (ii) a more precise boundary of each detected object within its associated bounding box. In these embodiments, the overlapping region identification function 502 can be used to determine which bounding box in at least one of the segmented images 206 overlaps with the bounding box around each identified object 404. The more precise boundary within the bounding box in the segmented image(s) 206 can be output as a boundary 504 of each identified object 404. The overlapping region identification function 502 may use any suitable technique(s) to identify which object in the segmented image(s) 206 corresponds to each identified object 404. As a particular example, the overlapping region identification function 502 may implement the techniques described in Kuo et al., "FindIt: Generalized Localization with Natural Language Queries," European Conference on Computer Vision (ECCV), 2022, pages 502-520 (which is hereby incorporated by reference in its entirety).

As a particular example of this, assume the input images 202 capture multiple people within a scene. Each segmented image 206 can define a bounding box around each individual person and, within that bounding box, identify the more precise boundary of that person within the associated input image 202. An identified object 404 can include or be used to define a bounding box around a particular one of the people, such as when the bounding box is defined to surround "the person in the blue shirt." The overlapping region identification function 502 can determine which bounding box in at least one of the segmented images 206 most closely overlaps with the bounding box for the identified object 404 (a particular person), and the more precise boundary within that bounding box in the at least one segmented image 206 can be used as the boundary 504 for that particular person.

At that point, the operation identification and ordering function 218 can be used to determine which image processing operation or operations will be performed using the object(s) defined by the boundary or boundaries 504. The operation identification and ordering function 218 may also optionally identify the order of the image processing operations to be performed (assuming there are multiple image processing operations). The image processing function 222 can perform the image processing operation(s) on the identified object(s) 404 based on the boundary or boundaries 504 of the identified object(s) 404, and the resulting image can be provided as the output image 224.

Although FIGS. 2 through 5 illustrate one example of an architecture 200 supporting image burst editing based on NLP input and related details, various changes may be made to FIGS. 2 through 5. For example, various components and functions in each of FIGS. 2 through 5 may be combined, further subdivided, replicated, or rearranged according to particular needs. Also, one or more additional components and functions may be included in each of FIGS. 2 through 5 if needed or desired. Further, while FIGS. 3 through 5 illustrate specific embodiments of various functions shown in FIG. 2, each of the functions shown in FIG. 2 may be implemented in any other suitable manner. In addition, the input images 202 may be subjected to any desired pre-processing operation(s) prior to processing by the architecture 200, and the output images 224 may be subjected to any desired post-processing operation(s) after generation by the architecture 200.

Figure 6:
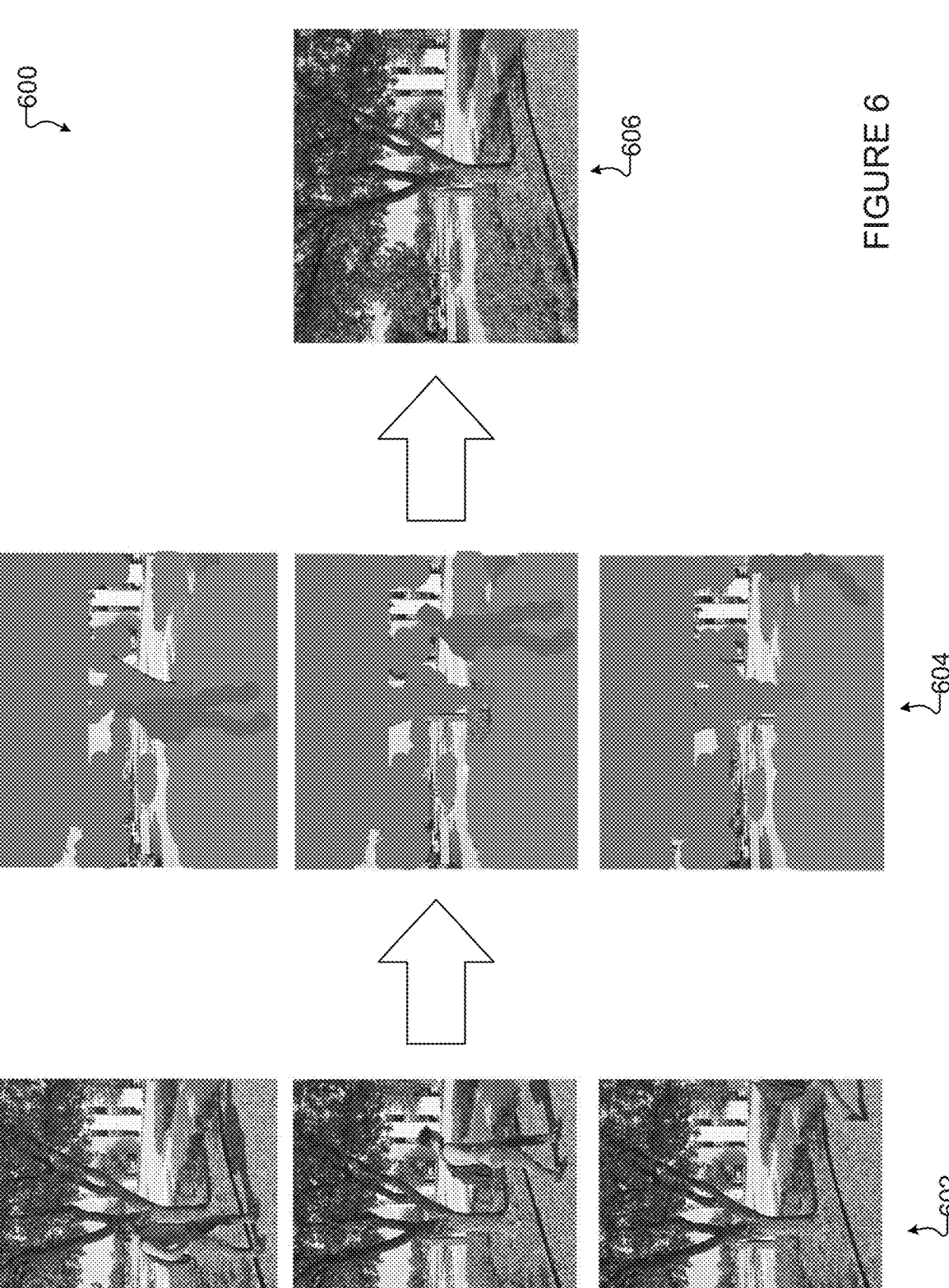
FIGS. 6 and 7 illustrate example image processing tasks that may be performed using the architecture of FIG. 2 in accordance with this disclosure.
Figure 7:
Figure 7:
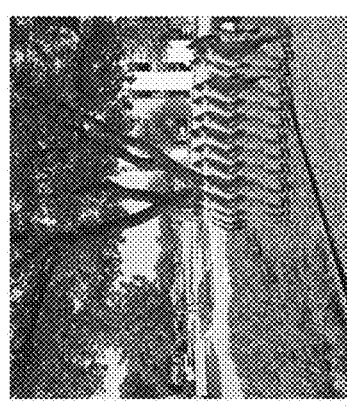
Figure 7:
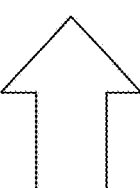
Figure 7:
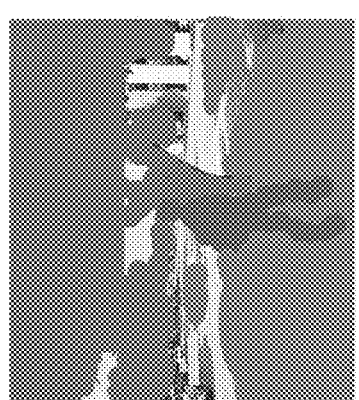
Figure 7:
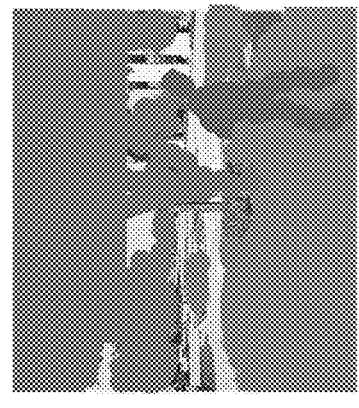
Figure 7:
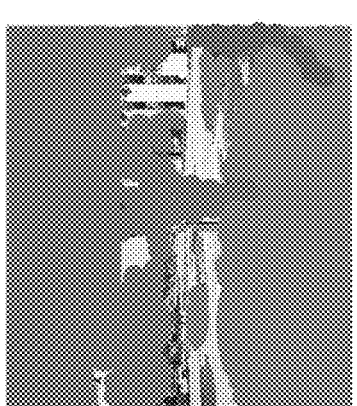
Figure 7:
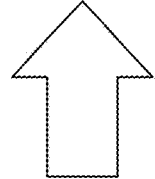
Figure 7:
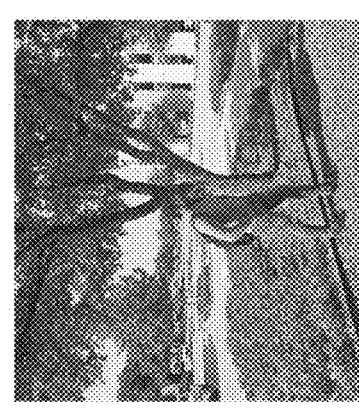
Figure 7:
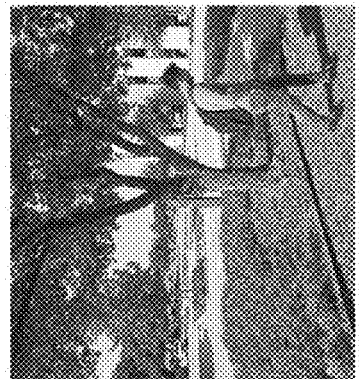
Figure 7:
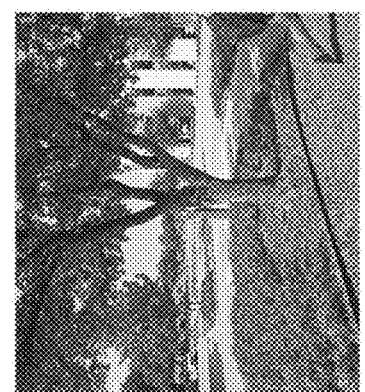

FIGS. 6 and 7 illustrate example image processing tasks 600 and 700 that may be performed using the architecture 200 of FIG. 2 in accordance with this disclosure. More specifically, FIG. 6 illustrates an example image processing task 600 for removing an object from a burst of input images using the architecture 200 of FIG. 2, and FIG. 7 illustrates an example image processing task 700 for creating artistic motion blur based on a burst of input images using the architecture 200 of FIG. 2.

As shown in FIG. 6, a burst of input images 602 has been obtained. In this example, the burst of input images 602 includes multiple images of a person walking in front of a tree. The burst of input images 602 can be processed using the instance segmentation function 204 in order to generate segmented images 604. As can be seen here, each segmented image 604 represents an instance segmentation mask that generally identifies which pixels of an associated input image 602 are associated with different semantic classes along with different instances of each of those occurrences, where the different semantic classes are associated with different types of image contents. Examples of the different types of image contents are provided above. Among other things, portions of the segmented images 604 in FIG. 6 identify which pixels in the associated input images 602 correspond to the person captured in the input images 602.

If a user provides a natural language input 208 of "Remove the person," the NLP engine 210 can process the natural language input 208 and determine that the identified action 306 is an object removal and that the identified object 404 is the person within the input images 602. The NLP engine 210 can also process at least one of the segmented images 604 and the identified object 404 in order to determine that the object removal should occur within the identified boundary 504 of the person (as contained in the at least one segmented image 604). The NLP engine 210 can further determine that the operation listing 220 should include an isolation operation that identifies image data within one or more regions of at least one of the input images 602 that were occluded by the person in at least one other of the input images 602, as well as a blending operation that combines image data from the input images 602 so as to replace the person. This results in the generation of an output image 606 in which the person has been removed.

As shown in FIG. 7, the same burst of input images 602 has been obtained and used to generate the same segmented images 604. If a user provides a natural language input 208 of "Create artistic motion blur for the person," the NLP engine 210 can process the natural language input 208 and determine that the identified action 306 is blur creation and that the identified object 404 is the person within the input images 602. The NLP engine 210 can also process at least one of the segmented images 604 and the identified object 404 in order to determine that the motion blur should occur for the person within the identified boundary 504 (as contained in the at least one segmented image 604). The NLP engine 210 can further determine that the operation listing 220 should include an isolation operation that identifies image data within each input image 602 associated with the person, as well as a blending operation that replicates the image data associated with the person multiple times in between two or more locations of the person within the input images 602. This results in the generation of an output image 702 in which artistic motion blur is associated with movement of the person in the scene.

Although FIGS. 6 and 7 illustrate examples of image processing tasks 600 and 700 that may be performed using the architecture 200 of FIG. 2, various changes may be made to FIGS. 6 and 7. For example, the actual contents of images can vary widely, and FIGS. 6 and 7 do not limit the scope of this disclosure to any particular type of image contents. Also, object removal and artistic motion blurring are two examples of the types of functions that may be initiated by a user via natural language inputs 208. However, any other suitable functions may be initiated by users via natural language inputs 208.

Figure 8:
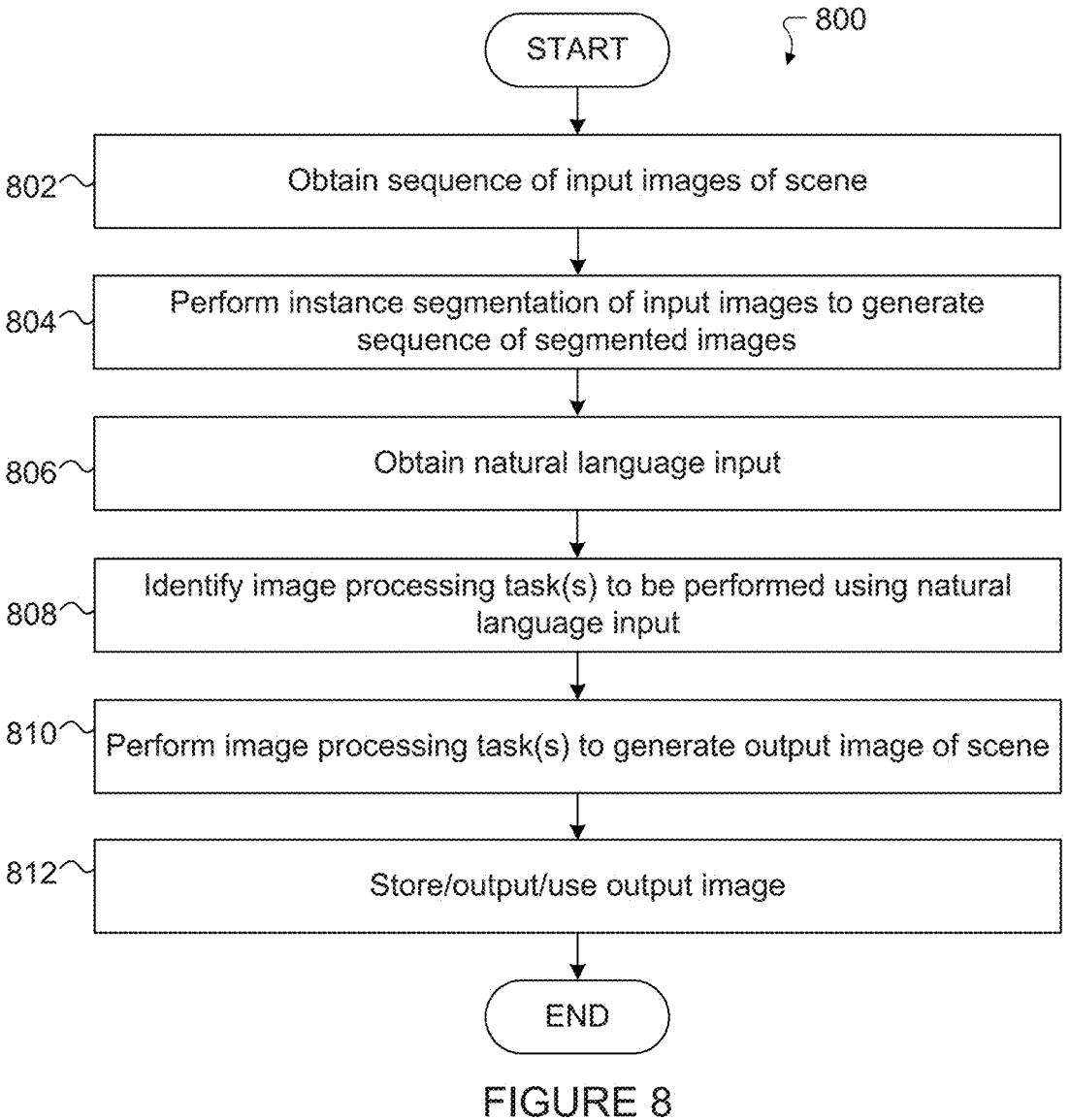
FIG. 8 illustrates an example method for image burst editing based on NLP input in accordance with this disclosure.

FIG. 8 illustrates an example method 800 for image burst editing based on NLP input in accordance with this disclosure. For ease of explanation, the method 800 shown in FIG. 8 is described as being performed by the electronic device 101 in the network configuration 100 of FIG. 1, where the electronic device 101 can implement the architecture 200 shown in FIG. 2. However, the method 800 shown in FIG. 8 could be performed by any other suitable device(s) and in any other suitable system(s), such as when the method 800 is performed using the server 106.

As shown in FIG. 8, a sequence of input images is obtained at step 802. This may include, for example, the processor 120 of the electronic device 101 obtaining a burst of input images 202 from any suitable source(s), such as from one or more cameras or other imaging sensors 180 of the electronic device 101. In some cases, the burst of input images 202 may be captured at or near the same time as other operations in the method 800. In other cases, the burst of input images 202 may be captured at an earlier time and obtained from a memory 130 of the electronic device 101. Instance segmentation of the input images is performed in order to generate a sequence of segmented images at step 804. This may include, for example, the processor 120 of the electronic device 101 performing the instance segmentation function 204 in order to generate instance segmentation masks or other segmented images 206. The instance segmentation process segments each of the input images 202 into different semantic classes while identifying each instance of at least one object in each of the semantic classes. Different semantic classes are associated with different types of image contents, such as people, trees, vehicles, etc. With instance segmentation, if there are multiple objects belonging to the same semantic class, those objects are identified separately.

A natural language input is obtained at step 806. This may include, for example, the processor 120 of the electronic device 101 obtaining a voice or other natural language input 208 from a user, where the natural language input 208 is associated with a desired operation to be performed using the input images 202. One or more image processing tasks to be performed are identified using the natural language input at step 808. This may include, for example, the processor 120 of the electronic device 101 using the NLP engine 210 to generate an operation listing 220 that identifies the one or more image processing operations to be performed. As a particular example, the NLP engine 210 may be used to generate an identified action 306 and at least one identified object 404 based on the natural language input 208 and to generate a boundary 504 of each identified object 404 based on at least one of the segmented images 206.

The one or more image processing tasks are performed at step 810. This may include, for example, the processor 120 of the electronic device 101 performing the image processing function 222 in order to perform the one or more image processing tasks identified in the operation listing 220. This may also include the image processing function 222 performing multiple image processing tasks in the order identified in the operation listing 220. This results in the generation of an output image 224. The output image is stored, output, or used in some manner at step 812. For example, the output image 224 may be displayed on the display 160 of the electronic device 101, saved to a camera roll stored in a memory 130 of the electronic device 101, or attached to a text message, email, or other communication to be transmitted from the electronic device 101. Of course, the output image 224 could be used in any other or additional manner.

Although FIG. 8 illustrates one example of a method 800 for image burst editing based on NLP input, various changes may be made to FIG. 8. For example, while shown as a series of steps, various steps in FIG. 8 may overlap, occur in parallel, occur in a different order, or occur any number of times.

It should be noted that the functions shown in or described with respect to FIGS. 2 through 8 can be implemented in an electronic device 101, server 106, or other device(s) in any suitable manner. For example, in some embodiments, at least some of the functions shown in or described with respect to FIGS. 2 through 8 can be implemented or supported using one or more software applications or other software instructions that are executed by the processor 120 of the electronic device 101, server 106, or other device(s). In other embodiments, at least some of the functions shown in or described with respect to FIGS. 2 through 8 can be implemented or supported using dedicated hardware components. In general, the functions shown in or described with respect to FIGS. 2 through 8 can be performed using any suitable hardware or any suitable combination of hardware and software/firmware instructions. Also, the functions shown in or described with respect to FIGS. 2 through 8 can be performed by a single device or by multiple devices.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

obtaining, using at least one processor of an electronic device, a sequence of images of a scene;

performing, using the at least one processor, instance segmentation of the sequence of images to generate a sequence of segmented images, wherein performing the instance segmentation comprises (i) segmenting each of the images into semantic classes and (ii) separately identifying two or more objects in the scene associated with a common semantic class, wherein different semantic classes are associated with different types of image contents, wherein each identified object is associated with (i) a first bounding box around the identified object in the sequence of segmented images and (ii) a more-precise boundary of the identified object within the first bounding box; and processing, using the at least one processor, the sequence of segmented images to generate a final image of the scene, the sequence of segmented images processed using one or more image processing operations determined using a natural language processing (NLP) engine;

wherein processing the sequence of segmented images to generate the final image of the scene comprises:

identifying at least one second bounding box around at least one specific object in the sequence of images of the scene;

identifying at least one of the first bounding boxes that overlaps with the at least one second bounding box;

identifying the more-precise boundary associated with each of the at least one of the first bounding boxes; and performing the one or more image processing operations using the more-precise boundary associated with each of the at least one of the first bounding boxes.

2. The method of claim 1, further comprising:

determining the one or more image processing operations to be performed using the NLP engine.

3. The method of claim 2, wherein determining the one or more image processing operations to be performed comprises:

providing a user input to the NLP engine;

identifying an action to be performed from among multiple actions based on the user input using the NLP engine;

identifying the at least one specific object in the scene based on the user input using the NLP engine; and identifying the one or more image processing operations to be performed in order to perform the identified action involving the at least one specific object using the NLP engine.

4. The method of claim 3, wherein:

determining the one or more image processing operations to be performed further comprises mapping the at least one specific object to results of the instance segmentation; and the one or more image processing operations to be performed are identified in order to perform the identified action involving the at least one specific object as mapped to the results of the instance segmentation.

5. The method of claim 3, wherein identifying the at least one specific object in the scene based on the user input comprises using machine learning-based dependency parsing to identify the at least one specific object in the scene as being associated with the identified action.

6. The method of claim 3, wherein determining the one or more image processing operations to be performed further comprises determining an order in which to perform multiple image processing operations.

7. The method of claim 1, wherein the one or more image processing operations are performed in order to at least one of:

remove the at least one specific object in the scene;

create artistic motion blurring with motion that is extrapolation based on the sequence of images;

enhance colors of the at least one specific object in the scene;

change a color saturation in the sequence of images;

remove colors from the at least one specific object in the scene; or stretch or shrink the at least one specific object in the scene.

8. An electronic device comprising:

at least one imaging sensor configured to capture a sequence of images of a scene; and at least one processor configured to:

perform instance segmentation of the sequence of images to generate a sequence of segmented images, wherein, to perform the instance segmentation, the at least one processor is configured to (i) segment each of the images into semantic classes and (ii) separately identify two or more objects in the scene associated with a common semantic class, wherein different semantic classes are associated with different types of image contents, wherein each identified object is associated with (i) a first bounding box around the identified object in the sequence of segmented images and (ii) a more-precise boundary of the identified object within the first bounding box; and process the sequence of segmented images to generate a final image of the scene, wherein the at least one processor is configured to process the sequence of segmented images using one or more image processing operations determined using a natural language processing (NLP) engine;

wherein, to process the sequence of segmented images to generate the final image of the scene, at least one processor is configured to:

identify at least one second bounding box around at least one specific object in the sequence of images of the scene;

identify at least one of the first bounding boxes that overlaps with the at least one second bounding box;

identify the more-precise boundary associated with each of the at least one of the first bounding boxes; and perform the one or more image processing operations using the more-precise boundary associated with each of the at least one of the first bounding boxes.

9. The electronic device of claim 8, wherein the at least one processing device processor is further configured to determine the one or more image processing operations to be performed using the NLP engine.

10. The electronic device of claim 9, wherein, to determine the one or more image processing operations to be performed, the at least one processor is configured to:

provide a user input to the NLP engine;

identify an action to be performed from among multiple actions based on the user input using the NLP engine;

identify the at least one specific object in the scene based on the user input using the NLP engine; and identify the one or more image processing operations to be performed in order to perform the identified action involving the at least one specific object using the NLP engine.

11. The electronic device of claim 10, wherein, to determine the one or more image processing operations to be performed, the at least one processor is further configured to map the at least one specific object to results of the instance segmentation.

12. The electronic device of claim 10, wherein the at least one processor is configured to use machine learning-based dependency parsing to identify the at least one specific object in the scene as being associated with the identified action.

13. The electronic device of claim 10, wherein the at least one processor is further configured to determine an order in which to perform multiple image processing operations.

14. The electronic device of claim 8, wherein the at least one processor is configured to perform the one or more image processing operations in order to at least one of:

remove the at least one specific object in the scene;

create artistic motion blurring with motion that is extrapolation based on the sequence of images;

enhance colors of the at least one specific object in the scene;

change a color saturation in the sequence of images;

remove colors from the at least one specific object in the scene; or stretch or shrink the at least one specific object in the scene.

15. A non-transitory machine readable medium containing instructions that when executed cause at least one processor of an electronic device to:

obtain a sequence of images of a scene;

perform instance segmentation of the sequence of images to generate a sequence of segmented images, wherein the instructions that when executed cause the at least one processor to perform the instance segmentation comprise instructions that when executed cause the at least one processor to (i) segment each of the images into semantic classes and (ii) separately identify two or more objects in the scene associated with a common semantic class, wherein different semantic classes are associated with different types of image contents, wherein each identified object is associated with (i) a first bounding box around the identified object in the sequence of segmented images and (ii) a more-precise boundary of the identified object within the first bounding box; and process the sequence of segmented images to generate a final image of the scene, wherein the instructions that when executed cause the at least one processor to process the sequence of segmented images comprise instructions that when executed cause the at least one processor to process the sequence of segmented images using one or more image processing operations determined using a natural language processing (NLP) engine;

wherein the instructions that when executed cause the at least one processor to process the sequence of segmented images to generate the final image of the scene comprise instructions that when executed cause the at least one processor to:

identify at least one second bounding box around at least one specific object in the sequence of images of the scene;

identify at least one of the first bounding boxes that overlaps with the at least one second bounding box;

identify the more-precise boundary associated with each of the at least one of the first bounding boxes; and perform the one or more image processing operations using the more-precise boundary associated with each of the at least one of the first bounding boxes.

16. The non-transitory machine readable medium of claim 15, further containing instructions that when executed cause the at least one processor to determine the one or more image processing operations to be performed using the NLP engine.

17. The non-transitory machine readable medium of claim 16, wherein the instructions that when executed cause the at least one processor to determine the one or more image processing operations to be performed comprise:

instructions that when executed cause the at least one processor to:

provide a user input to the NLP engine;

identify an action to be performed from among multiple actions based on the user input using the NLP engine;

identify the at least one specific object in the scene based on the user input using the NLP engine; and identify the one or more image processing operations to be performed in order to perform the identified action involving the at least one specific object using the NLP engine.

18. The non-transitory machine readable medium of claim 17, wherein the instructions that when executed cause the at least one processor to determine the one or more image processing operations to be performed further comprise:

instructions that when executed cause the at least one processor to map the at least one specific object to results of the instance segmentation.

19. The non-transitory machine readable medium of claim 17, further containing instructions that when executed cause the at least one processor to determine an order in which to perform multiple image processing operations.

20. The non-transitory machine readable medium of claim 15, wherein the instructions when executed cause the at least one processor to perform the one or more image processing operations in order to at least one of:

remove the at least one specific object in the scene;

create artistic motion blurring with motion that is extrapolation based on the sequence of images;

enhance colors of the at least one specific object in the scene;

change a color saturation in the sequence of images;

remove colors from the at least one specific object in the scene; or stretch or shrink the at least one specific object in the scene.

* * * * *